Inventor
Edmund T. Allen
George S. Schairer
By Reynolds + Beach
Attorney

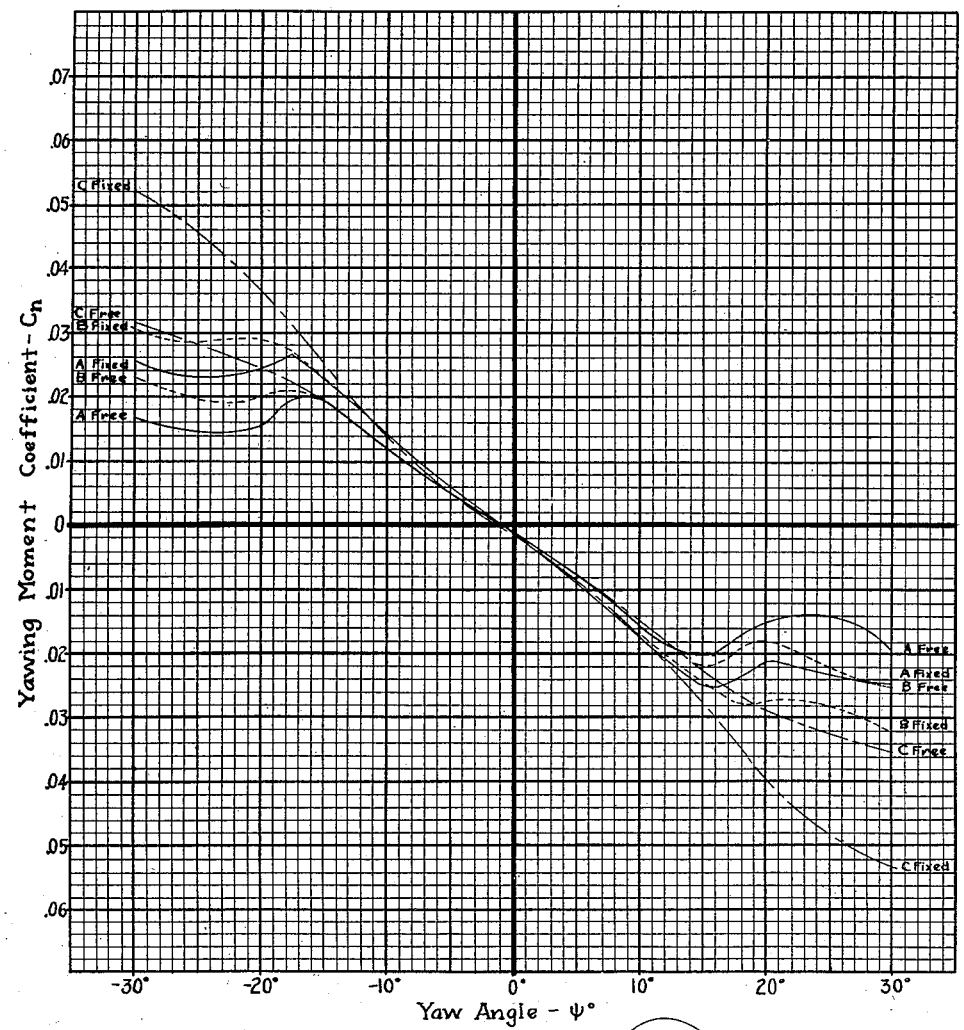
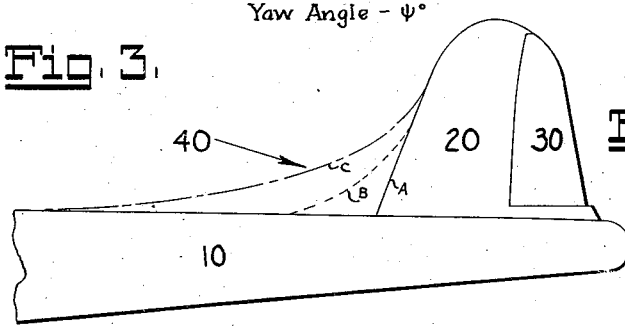

UNITED STATES PATENT OFFICE 2,356,139

AIRCRAFT EMPENNAGE

Edmund T. Allen and George S. Schairer, Seattle, Wash., assignors to Boeing Aircraft Company, Seattle, Wash., a corporation of Washington Application August 3, 1940, Serial No. 350,572

12 Claims. (Cl. 244—91)

Our invention pertains to an empennage for aircraft, relating particularly to the stabilizing surface portions of such an empennage, usually, but not necessarily, mounted directly upon the aircraft body, and having its greatest usefulness on aircraft of the heavier-than-air type.

Modern airplanes used for military purposes and on air lines for scheduled transport operations usually have more than one engine, at the present time either two or four. In such installations all the engines are of the outboard type, so that if one or more engines are not operated, either through choice or because of mechanical failure, the airplane may be flown in a yawing position. The angle of yaw to maintain straight flight under such conditions depends upon the number, power, and location of the engines not in operation, but such angle may be as much as 10° or more under some conditions.

As an airplane encounters varying wind conditions in supposedly straight flight, with no initial condition of yaw, it does have yawing movement to a greater or lesser degree. A principal function of the vertical fin or stabilizing surface is to produce an aerodynamic restoring moment for returning the airplane to a straight course automatically and without attention by the pilot. If the airplane, prior to entering a disturbed region which would cause it to yaw, has an initial yaw, the resultant angle of yaw of the airplane may be as much as 30°.

As airplanes have increased in size the problem of proper stability has become more critical, since such an airplane displaced about its vertical axis through a given angle of yaw has more inertia which must be overcome in order to return the aircraft to its initial condition. By the use of outboard engines, some of which may not be operating, the problem is further aggravated. Because of these considerations it has been found that conventional empennage structures fail to give the desired stability, since they do not produce adequate restoring moments for large angles of yaw, particularly in excess of 15° or 20°, although some tail surfaces produce insufficient restoring forces at much smaller angles of yaw. As a result the airplane may swing farther, the pilot may lose control, and a serious accident may result, particularly if the conditions are critical such as when taking off.

We have found that the desired directional stability of large airplanes may be obtained at large angles of yaw by combining with a conventional vertical fin what we term a dorsal fin having a considerable length along the fuselage, although its projection laterally outward from the fuselage may be small, much less than the projection of the vertical fin proper. The larger, both lengthwise and laterally, such a dorsal fin is made the greater restoring moment we have found it produces at angles of yaw exceeding about 10°, although no appreciable increase in restoring force is produced by it at angles of yaw less than 10°. In particular the increase in restoring force is great for angles of yaw beyond the stalling angle of the vertical fin alone and even of the vertical and dorsal fin combination. Not only is the restoring force thus increased, but the angle of stall for the combination is greater than that for the vertical fin alone. The stalling angle is to be understood as that angle at which the restoring force created by the fin no longer increases with increase in angle of yaw, but instead decreases more or less rapidly at greater yaw angles. Whereas the stalling angle for stabilizing fins of the conventional type may be only 15° or 20°, the use of our fin we have found will increase the angle of stall, and even if a stall condition is reached the restoring moment at that point is much greater than without the dorsal fin and the decrease in restoring moment for greater angles is less rapid than where the conventional fin alone is used.

One may select a vertical fin having proportions which will produce a satisfactory restoring moment for small angles of departure from the straight flight direction. By the use of this invention, the restoring moment of such a fin for angles exceeding about 10° of departure from alignment with the fin may then be increased, the normal stall angle of such fin may be increased, if a stall is finally reached a much greater restoring moment will be produced at such angle of stall, and thereafter the rate of decrease in restoring moment for angles greater than such stall angle may be retarded.

These results we obtain by the use in conjunction with a conventional stabilizing surface, such as a vertical fin, of a long and relatively narrow stabilizing surface, which we designate a dorsal fin, extending forward from and faired into the conventional stabilizing surface. Normally a movable control surface associated with the stabilizing surface will be provided, such as the normal rudder, and the entire structure constitutes an airfoil reacting with the air to control the aircraft in flight. Just as conventional stabilizing surfaces and control surfaces vary in shape, according to the results desired in particular installations, so our novel stabilizing surface or dorsal fin may vary in length, width, and contour within the scope of the appended claims, according to the type and shape of aircraft body, conventional stabilizing surface, and control surface with which it is to be used, and according to the characteristics which the complete structure is to possess.

Figure 3 is a graph illustrating characteristics of the airfoil structures shown in side elevation in Figure 4.

As an example of a specific embodiment of our invention, and one where it is of most value, we have shown two vertical fin and control assemblies of conventional shape, to which dorsal fins of various types and sizes have been applied.

Figure 1:
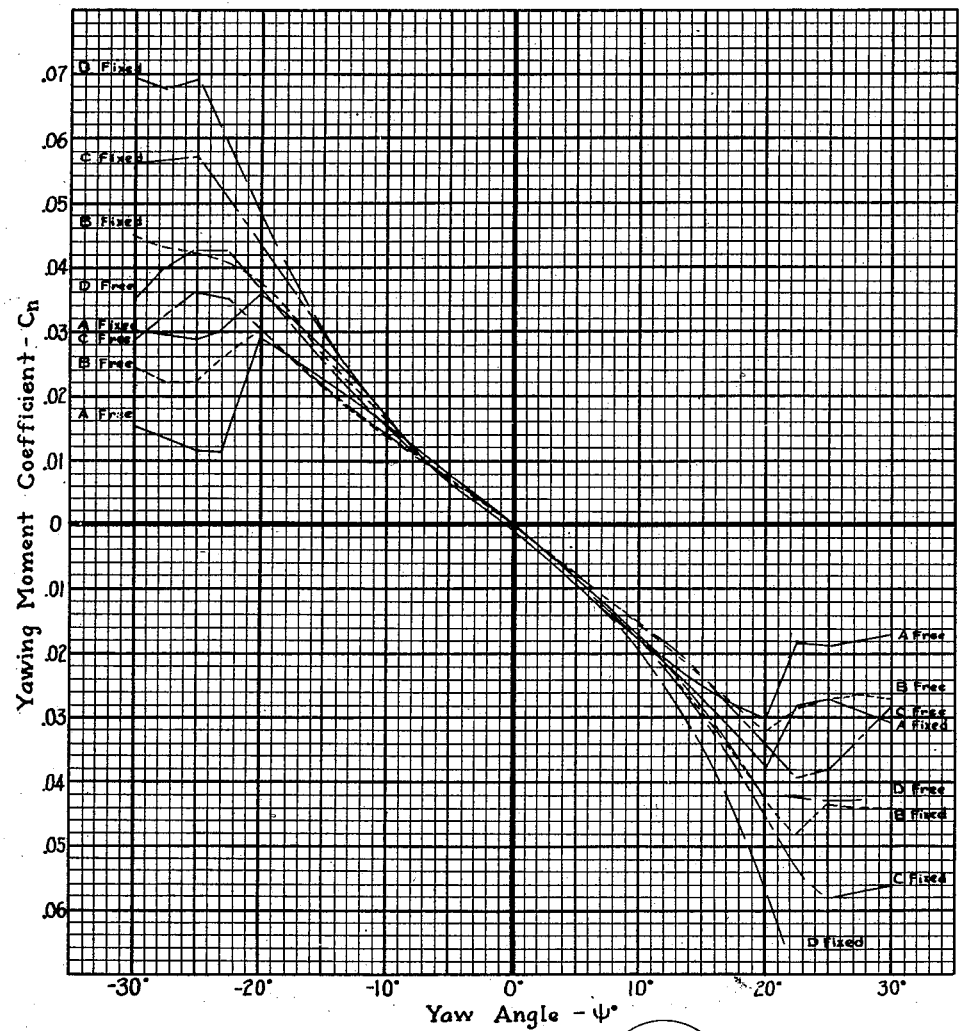
Figure 1 is a graph illustrating characteristics of the airfoil structures shown in side elevation in Figure 2.
Figure 2:
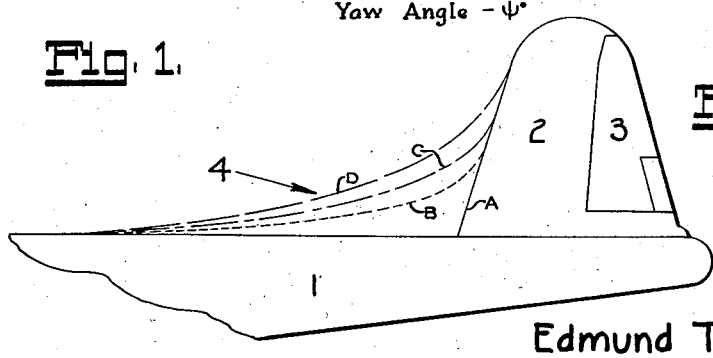

Considering the application of dorsal fins to the vertical tail surface shown in Figure 2, 1 represents the aircraft body, such as the tail of an airplane, upon which the conventional vertical fin 2 is mounted, and upon the rear edge of which is pivoted a rudder 3. Ahead of the fin 2, and also mounted upon the fuselage 1, is a dorsal fin 4, which is faired into the leading edge of and forms a structure integral with the vertical fin 2. The profiles of three different dorsal fins are shown at B, C, and D, line A indicating the profile of the leading edge of vertical fin 2, where no dorsal fin is used in conjunction with it. The diagrammatic, superposed illustrations of this vertical surface without a dorsal fin, and with various dorsal fins, are shown for the purpose of comparing the results obtained by the use of fins of varying contours, as illustrated by the curves of Figure 1, and of coordinating such curves with the several profiles shown in Figure 2.

The curves of Figure 1 show the results of actual wind tunnel tests on the airfoil structures of Figure 2. They illustrate the yawing moment coefficients of the several airfoil structures corresponding to various yaw angles, in one instance for each structure with the rudder fixed so that as the angle of yaw changes it cannot swing from the plane of the vertical fin 2 and dorsal fin 4, and in the other instance with the rudder free, so that it may swing into alignment with the airstream as the plane of the vertical fin 2 and dorsal fin 4 assumes various angles of yaw with respect to the airstream. The yawing moment coefficient $C_n$ is defined in report No. 474 of the National Advisory Committee for Aeronautics entitled "Nomenclature for Aeronautics," on page 32, as an absolute coefficient of yawing moment, and which is directly proportional to the yawing moment for constant air density, velocity, span, and area factors. By comparing the values of this coefficient, therefore, the effect of changes in area, span, air velocity, and air density need not be considered.

In the curves of Figure 1 it will be noted that the type of line used for each corresponds to the type of line used to designate the respective profile shown in Figure 2, giving the characteristics indicated by the curve. For each such profile two curves are shown, one designated "free," indicating the results with the rudder 3 free to swing with respect to the vertical fin 2, and the other "fixed," showing the results where the rudder is held from swinging with respect to the vertical surface 2. In comparing the rudder-free and rudder-fixed curves for each profile it will be noted, as expected, that in each case the rudder-free curve has a smaller coefficient for any given angle than the rudder-fixed curve. A comparison of the rudder-free curves for the various profiles A, B, C, and D shows, however, that the angle of stall, where the curves break and start in the opposite direction, progressively increases, and the same is true in a comparison of the rudder-fixed curves for the several profiles A, B, C, and D. Moreover, when the several structures including the dorsal fins are used, the value of the coefficient at the point of stall is much higher than where no dorsal fin is employed, and the larger the dorsal fin the greater the difference in coefficient becomes.

Thus, comparing the several factors of stall angle, coefficient at the stall angle of the surface without a dorsal fin, and the coefficient 2½° after the stall angle of the surface without a dorsal fin is reached, the following tabulation may be made:

|  | Angle of stall | Coefficient at 20° | Coefficient at 22½° |
| --- | --- | --- | --- |
|  | Degree |  |  |
| A rudder free | 20 | .03 | .018 |
| B rudder free | 20 | .031 | .028 |
| C rudder free | 22½ | .032 | .036 |
| D rudder free | 22½ | .038 | .042 |
| A rudder fixed | 20 | .037 | .03 |
| B rudder fixed | 22½ | .040 | .043 |
| C rudder fixed | 25 | .044 | .052 |
| D rudder fixed | 25 | .05 | .06 |

While there is some slight experimental variation as shown by the curves, the above tabulation gives average values and illustrates what a great increase is obtained in the yawing moment coefficient at 22½° where a dorsal fin is used, and the effect of increasing the height of such fin. It will be seen from Figure 2 that although the length of the several dorsal fins are substantially the same, the yawing moment coefficient increases with increase in height of the dorsal fin where it joins the conventional vertical fin 2. Even a low dorsal fin with profile B is shown to be very material advantage, however.

The stalling characteristics of an airfoil structure vary with the shape of the aircraft on which it is used, as well as with the shape and proportions of the individual surface. Figure 4 illustrates an example involving an entirely different airplane and vertical fin 20 and rudder 30 mounted on fuselage 10. The wind tunnel model of this airplane was tested with different shapes of dorsal fin 40, the profiles of the tail surface without a dorsal fin, with a small dorsal fin, and with a larger dorsal fin being designated A, B, and C, respectively. As before, the type of line used to designate these several profiles corresponds to the type of line employed for their respective yawing moment coefficient curves shown in Figure 3, and such curves illustrate the results of actual wind tunnel tests.

Where no dorsal fin is used, the vertical fin 20 and rudder 30 stalls at about 16°, indicating a less desirable and more critical installation than in the airplane of Figure 2, which did not stall until an angle of 20° was reached.

Again a tabulation of comparative characteristics may be made:

|  | Angle of stall | Coefficient at 16° | Coefficient at 22½° |
| --- | --- | --- | --- |
|  | Degree |  |  |
| A rudder free | 16 | .02 | .014 |
| B rudder free | 17 | .021 | .019 |
| C rudder free | Over 30 | .022 | .028 |
| A rudder fixed | 17 | .024 | .022 |
| B rudder fixed | 19 | .025 | .027 |
| C rudder fixed | Over 30 | .028 | .042 |

It will be noted from a comparison of these figures that the use of the small dorsal fin having the profile B helps somewhat, but it is not nearly as effective as if, for the same height, its length approached the length of fin C. The dorsal fin C of Figure 4 corresponds generally to the dorsal fin D of Figure 2, and it will be evident that dosal fin B of Figure 4 does not prove nearly as relatively effective as dorsal fin C of Figure 2, which is of about the same relative height. In fact, even dorsal fin B of Figure 2 shows much more relative improvement than dorsal fin B of Figure 4, indicating that the length which the dorsal fin extends forward from the conventional vertical fin is a more important factor than the height of the dorsal fin where it joins the conventional vertical fin.

It will be understood that specific examples and corresponding tests of our invention have been given to illustrate its characteristics and capabilities. As has been pointed out, various changes in the shape of the dorsal fin used would necessarily be made according to the characteristics of the aircraft and empennage without such a fin, and the changes which it is desired to make in such characteristics by the addition of our dorsal fin. It is evident from the above discussion, however, that certain proportions in general will be desirable. The overall length of the airfoil structure, measured parallel to the longitudinal axis of the airplane, which the dorsal fin, vertical fin, and control surface, if any, constitutes, is very important, and we prefer that such length, which may be designated the "run", in order to obtain a substantial increase in yawing moment coefficient or stall angle, be at least approximately twice the maximum lateral width of this airfoil structure outwardly from the fuselage. For brevity such lateral width will be designated the "rise" of the empennage unit measured perpendicular to the longitudinal axis of the airplane outward from its skin, whether such projection be vertical or otherwise. The maximum width portion, or "crown", of the composite empennage unit or airfoil structure in the examples, defined by the vertical fins 2 and 20 and rudders 3 and 30 will, of course, be rearwardly of a laterally directed center line midway between the front and rear ends of the complete unit. The tip of the rudder or control section in each case will be rearward of such crown. From this portion of maximum width the airfoil structure will taper forward to its front end, such taper at first being steep, and changing quite abruptly to a gradual taper farther forward, the latter preferably continuing to a point at the front end smoothly merging with the aircraft body.

For measurement purposes it is convenient to use as a reference dimension the maximum lateral width ordinate, measured from the fuselage skin outward in a direction perpendicular to the longitudinal axis of the airplane, at the location of maximum rise, which usually will substantially coincide with the center of the empennage unit crown. At locations on the dorsal fin forward of the composite airfoil's crown center corresponding to runs equal to one-quarter, one-half, and three-quarters of the maximum ordinate, the rise will be within the ranges, respectively, of 70–95% (usually between 80 and 85%), 25–50%, and 10–35% of the maximum ordinate, and the rise at the location corresponding to a run equal to the maximum ordinate ahead of the crown center should be not greater than one-quarter of the maximum ordinate. The complete airfoil extends forward at least to this last location, and preferably has a further run approximating the maximum ordinate, the taper of such front portion being very gradual and uniform, or substantially so, the angle between its outer and inner edges not exceeding about 15°. Expressing the height proportions in another way, at a location forward of the crown center a run corresponding to one-half of the maximum ordinate the rise will be between 30% and 65%, and preferably about one-half, of the rise at a run one-quarter of the maximum ordinate forward of the crown center, and at a location forward of the crown center a distance equal to the maximum ordinate the rise will be between 40% and 60%, and preferably about one-half of the rise at a run one-half of the maximum ordinate forward of the crown center. We have employed a perfectly straight outer edge in conjunction with a slightly convex fuselage, but if the fuselage is straight, as shown in Figures 2 and 4, it is preferable that the outer edge of the dorsal fin be slightly concave. In any event, however, this curvature will be slight, and the taper will therefore be very nearly uniform. Even an irregular outer edge may be employed without detrimental results, if its general characteristics are as described.

The dorsal fin should be faired smoothly into the vertical fin portion, such as by a concave leading edge, and we prefer that the contour of the leading edge include a portion of cyma reversa curved shape, the zone of such curvature being principally between the crown center of the airfoil structure and a location approximately three-quarters of the maximum ordinate ahead of the crown center. The location of curvature reversal of such curved portion is about one-third of the maximum ordinate of such structure ahead of the crown center. As the outer edge of the dorsal fin progresses forward of this cyma reversa curved portion the taper will become substantially uniform, and the angle between the outer and inner edges will decrease below 15° ordinarily, as previously mentioned. The leading edge may be of either ogival or rounded shape in section without noticeably affecting the characteristics of the dorsal fin.

What we claim as our invention is:

1. In an empennage on an aircraft body, a composite stabilizer section and control section airfoil structure extending lengthwise of such body and projecting laterally therefrom, its rear portion being crowned and its front portion tapering forwardly from such crown, the stabilizer section extending rearwardly at least substantially to the center of such crown, the rise of said structure at a location forward of the crown center a distance equal to one-half of the maximum ordinate of such structure being between one-third and one-half of such maximum ordinate, and the rise of said structure at a location forward of the crown center a distance equal to such maximum ordinate being between one eighth and one-quarter of such maximum ordinate.

2. In an empennage on an aircraft body, a composite stabilizer section and control section airfoil structure extending lengthwise of such body and projecting laterally therefrom, its rear portion being crowned and its front portion tapering forwardly from such crown, the stabilizer section extending rearwardly at least substantially to the center of such crown, the rise of said structure at locations forward of the crown center distances equal to one-quarter, one-half, and three-quarters of the maximum ordinate of such structure being within the ranges, respectively, of 70-95%, 30-50%, and 20-35% of such maximum ordinate, and the rise of said structure at a location forward of the crown center a distance equal to such maximum ordinate being 15-25% of such maximum ordinate.

3. In an empennage on an aircraft body, a composite stabilizer section and control section airfoil structure extending lengthwise of such body and projecting laterally therefrom, its rear portion being crowned, the stabilizer section extending rearwardly at least substantially to the center of such crown, and the run of said structure forward of the crown center being at least approximately twice the maximum ordinate of said structure, the structure tapering steeply forwardly from such crown substantially to a location forward of the crown center a distance equal to one-half of such maximum ordinate, the rise at such location being between one-third and one-half of such maximum ordinate, and the taper from such location forward substantially to a point at the front end of the structure being gradual as compared to the taper rearwardly thereof.

4. In an empennage on an aircraft body, a composite stabilizer section and control section airfoil structure extending lengthwise of such body and projecting laterally therefrom, its rear portion being crowned, the stabilizer section extending rearwardly at least substantially to the center of such crown, the run of said structure forward of the crown center being at least approximately twice the maximum ordinate of said structure, the structure tapering steeply forwardly from such crown substantially to a location forward of the crown center a distance equal to one-half of such maximum ordinate, the taper forward of such location substantially to its front end being gradual as compared to the taper rearwardly thereof, the rise of said structure at locations forward of the crown center distances equal to one-quarter, one-half, and three-quarters of the maximum ordinate of such structure being within the ranges, respectively, of 70-95%, 30-50%, and 20-35% of such maximum ordinate, and the rise of said structure at a location forward of the crown center a distance equal to such maximum ordinate being 15-25% of such maximum ordinate.

5. In an empennage on an aircraft body, a composite stabilizer section and control section airfoil structure extending lengthwise of such body and projecting laterally therefrom, the outer edge of said structure including a crowned rear portion and a front portion curved in cyma reversa profile extending forwardly from such crown, the stabilizer section extending rearwardly at least substantially to the center of such crown, the run of said structure forward of such crown center being at least approximately twice the maximum ordinate of said structure, the rise of said structure at locations forward of the crown center distances equal to one-quarter, one-half, and three-quarters of the maximum ordinate of such structure being within the ranges, respectively, of 70-95%, 30-50%, and 20-35% of such maximum ordinate, and the rise of said structure at a location forward of the crown center a distance equal to such maximum ordinate being 15-25% of such maximum ordinate.

6. In an empennage on an aircraft body, a composite stabilizer section and control section airfoil structure extending lengthwise of such body and projecting laterally therefrom, its rear portion being crowned, the stabilizer section extending rearwardly at least substantially to the center of such crown, the run of said structure forward of the crown center being at least approximately twice the maximum ordinate of said structure, the outer edge of such structure including a portion curved in cyma reversa profile extending forwardly from such crown to a location forward of the crown center a distance substantially equal to three-quarters of the maximum ordinate of said structure, the curvature reversal of such curved edge portion being at a location forward of the crown center a distance approximately equal to one-third of such maximum ordinate, and the rise of said structure at locations forward of the crown center distances equal to one-quarter, one-half, and three-quarters of the maximum ordinate of such structure being within the ranges, respectively, of 70-95%, 30-50%, and 20-35% of such maximum ordinate, and the rise of said structure at a location forward of the crown center a distance equal to such maximum ordinate being not greater than one-quarter of such maximum ordinate, the forward part of said structure tapering from such last location substantially to a point at its front end, and the angle between the inner and outer edges of such forward tapered portion not exceeding about 15 degrees.

7. In combination with an aircraft body, an empennage comprising a composite fin section and rudder section vertical tail surface upstanding from such body, including a high, crowned rear portion of the fin section producing, per se, a large yawing moment coefficient corresponding to any selected small yaw angle, and a dorsal fin portion of the fin section forwardly of and merging rearwardly into the high rear fin portion, to increase the yawing angle of stall of the vertical tail surface as a whole beyond that of the high rear fin portion of the tail surface per se, the run of the dorsal fin portion forward of the crown center of said rear portion being at least approximately twice as great as the maximum ordinate of said rear portion, and the rise of said dorsal fin portion at a location forward of the crown center of said rear portion a distance equal to one-half of such maximum ordinate being between one-third and one-half of such maximum ordinate.

8. In combination with an aircraft body, an empennage comprising a composite fin section and rudder section vertical tail surface upstanding from such body, including a high, crowned rear portion of the fin section producing, per se, a large yawing moment coefficient corresponding to any selected small yaw angle, the fin section extending rearwardly at least substantially to the center of such crown, and a dorsal fin portion of the fin section forwardly of and merging rearwardly into the high rear fin portion, to increase the yawing angle of stall and to increase the stall yawing moment coefficient at high angles of yaw of the vertical tail surface as a whole beyond that of the high rear fin portion of the tail surface per se, the run of the dorsal fin portion forward of the crown center of said rear portion being at least approximately twice as great as the maximum ordinate of said rear portion, and the rise of said dorsal fin portion at a location forward of the crown center of said rear portion a distance equal to one-half of such maximum ordinate being between one-third and one-half of such maximum ordinate.

9. In an empennage on an aircraft body, a composite stabilizer section and control section airfoil structure extending lengthwise of such body and projecting laterally therefrom, its rear portion being crowned and its front portion tapering forwardly from such crown, the stabilizer section extending rearwardly at least substantially to the center of such crown, the rise of said structure at a location forward of the crown center a distance equal to one-half of the maximum ordinate of such structure being between 30% and 65% of the rise at a location forward of the crown center a distance equal to one-quarter of the maximum ordinate.

10. In an empennage on an aircraft body, a composite stabilizer section and control section airfoil structure extending lengthwise of such body and projecting laterally therefrom, its rear portion being crowned and its front portion tapering forwardly from such crown, the stabilizer section extending rearwardly at least substantially to the center of such crown, the rise of said structure at a location forward of the crown center a distance equal to one-half of the maximum ordinate of such structure being between 30% and 65% of the rise at a location forward of the crown center a distance equal to one-quarter of the maximum ordinate, and the rise of the structure at a location forward of the crown center a distance equal to the maximum ordinate being between 40% and 60% of the rise at a location forward of the crown center a distance equal to one-half of the maximum ordinate.

11. In an empennage on an aircraft body, a composite stabilizer section and control section airfoil structure extending lengthwise of such body and projecting laterally therefrom, its rear portion being crowned and its front portion tapering forwardly from such crown, the stabilizer section extending rearwardly at least substantially to the center of such crown, the rise of said structure at a location forward of the crown center a distance equal to one-half of the maximum ordinate of such structure being approximately one-half of the rise at a location forward of the crown center a distance equal to one-quarter of the maximum ordinate.

12. The empennage of claim 11, in which the rise of the airfoil structure at a location forward of the crown center a distance equal to the maximum ordinate is approximately one-half of the rise at the location forward of the crown center a distance equal to one-half of the maximum ordinate of such structure.

EDMUND T. ALLEN.
GEORGE S. SCHAIRER.